(12) United States Patent
Binzer et al.

(10) Patent No.: US 9,276,327 B2
(45) Date of Patent: Mar. 1, 2016

(54) ARRAY ANTENNA FOR RADAR SENSORS

(75) Inventors: Thomas Binzer, Ingersheim (DE); Christian Waldschmidt, Renningen (DE); Raphael Hellinger, Pforzheim (DE); Thomas Hansen, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 446 days.

(21) Appl. No.: 13/821,033

(22) PCT Filed: Jul. 27, 2011

(86) PCT No.: PCT/EP2011/062863
§ 371 (c)(1),
(2), (4) Date: May 15, 2013

(87) PCT Pub. No.: WO2012/034763
PCT Pub. Date: Mar. 22, 2012

(65) Prior Publication Data
US 2013/0222204 A1    Aug. 29, 2013

(30) Foreign Application Priority Data

Sep. 15, 2010  (DE) .......................... 10 2010 040 793

(51) Int. Cl.
| H01Q 11/02 | (2006.01) |
| --- | --- |
| H01Q 21/00 | (2006.01) |
| G01S 7/03 | (2006.01) |
| H01Q 1/32 | (2006.01) |
| H01Q 13/20 | (2006.01) |
| G01S 13/93 | (2006.01) |

(52) U.S. Cl.
CPC .............. H01Q 21/0075 (2013.01); G01S 7/03 (2013.01); H01Q 1/3233 (2013.01); H01Q 13/206 (2013.01); G01S 13/931 (2013.01)

(58) Field of Classification Search
USPC .......................................... 343/731, 853, 893
See application file for complete search history.

(56) References Cited

U.S. PATENT DOCUMENTS

| 4,063,245 | A | 12/1977 | James et al. |
| --- | --- | --- | --- |
| 5,367,307 | A * | 11/1994 | Dupuis et al. .......... 343/700 MS |
| 5,422,649 | A | 6/1995 | Huang |
| 6,181,291 | B1 | 1/2001 | Anderson et al. |
| 8,558,745 | B2 * | 10/2013 | Habib et al. .................. 343/753 |
| 2009/0058741 | A1 * | 3/2009 | Shi ................................. 343/713 |
| 2010/0026584 | A1 | 2/2010 | Nakabayashi et al. |
| 2013/0027259 | A1 * | 1/2013 | Fujita et al. .................... 343/731 |

FOREIGN PATENT DOCUMENTS

| CN | 101552380 | 10/2009 |
| --- | --- | --- |
| CN | 101640316 | 2/2010 |

(Continued)

OTHER PUBLICATIONS

International Search Report, dated Oct. 20, 2011, issued in corresponding PCT/EP2011/062863.

*Primary Examiner* — Tan Ho
(74) *Attorney, Agent, or Firm* — Kenyon & Kenyon LLP

(57) ABSTRACT

An array antenna for radar sensors has a supply line, a plurality of antenna elements each connected to the supply line via a feed line, and circuit elements for distributing power to the antenna elements, in which the supply line is made reflective at one end and the circuit elements for power distribution are situated exclusively in the feed lines.

9 Claims, 1 Drawing Sheet

(56) References Cited

FOREIGN PATENT DOCUMENTS

| | | |
|---|---|---|
| DE | 26 06 271 | 8/1976 |
| EP | 1 058 339 | 12/2000 |
| EP | 2 117 077 | 11/2009 |
| JP | 56-47105 | 4/1981 |
| JP | H04287410 | 10/1992 |
| JP | H07202518 | 5/1995 |
| JP | 08-023223 | 1/1996 |
| JP | 8-23223 | 1/1996 |
| JP | 11-261324 | 9/1999 |
| JP | H11261324 | 9/1999 |
| JP | 3306592 | 2/2001 |
| JP | 2005-94440 | 4/2005 |
| JP | 2009141737 | 6/2009 |
| JP | 2010124194 | 6/2010 |
| WO | WO 2006/130795 | 12/2006 |

* cited by examiner

ARRAY ANTENNA FOR RADAR SENSORS

CROSS REFERENCE TO RELATED APPLICATIONS

The present application is the national stage entry of International Patent Application No. PCT/EP2011/062863, filed on Jul. 27, 2011, which claims priority to Application No. DE 10 2010 040 793.3, filed in the Federal Republic of Germany on Sep. 15, 2010.

FIELD OF INVENTION

The present invention relates to an array antenna for radar sensors, having a supply line, a plurality of antenna elements each connected to the supply line via a feed line, and having circuit elements for distributing power to the antenna elements.

BACKGROUND INFORMATION

In particular, the present invention relates to an array antenna for radar sensors used in motor vehicles in connection with driver assistance systems, for example in order to locate vehicles driving in front in an automatic distance regulating system (ACC: Adaptive Cruise Control). These radar sensors typically operate with a frequency of 24 GHz or 77 GHz.

In these applications, planar antennas that use microstrip technology have the advantage that they can be produced at relatively low cost and enable a flat design, and that no transitions are required between different line systems or line types. Like the other circuit components, the antenna elements can be formed simply by corresponding microstrip conductors on a circuit board.

In an array antenna, or antenna array, the power that is to be radiated is fed into the various antenna elements in such a way that a desired directional characteristic results through superposition and interference of the radiation emitted by the various antenna elements. For this purpose, the power levels and phases of the microwaves introduced into the individual antenna elements must be tuned in a suitable manner. As a rule, a directional characteristic is desired having a narrow main lobe and largely suppressed secondary lobes. Since, however, only limited space is available for the radar sensor and thus also for the antennas, a complete suppression of the secondary lobes can for the most part not be achieved.

In a conventional array antenna of the type named above, the feed lines to the individual antenna elements branch off from the supply line, and at the branching points so-called transformers are provided in the supply line that, through a suitable transformation of line impedances, bring about the desired distribution of power to the antenna elements. In the case of antennas in microstrip technology, the transformers are typically formed by line segments having differing widths and having a length that corresponds to one-fourth of the wavelength of the microwaves on the line.

However, the transformers in the supply line are disturbance points that cause undesired emissions and reflections. This not only limits the possibility for suppressing secondary lobes, but also makes more difficult the suppression of cross-polarizations, which is often desirable for example in order to prevent disturbance by other systems. Normally, the radiation emitted and received by the radar sensor has a particular polarization, for example a linear polarization in a particular direction. Cross-polarization is understood as a radiation component having a polarization orthogonal thereto.

Due to limitations in the forming of the branches, it is for the most part also not possible to distribute all the power supplied via a supply line completely to the antenna elements, and to radiate it completely via the antenna elements. For the most part, excess power remains on the supply line, and must either be radiated or destroyed at the end of this supply line. The radiation of the undesired power, however, again causes more pronounced secondary lobes. Destruction of the excess power using special absorbers has the disadvantage that the absorbers create additional costs and require additional space. Moreover, this solution has the disadvantage that higher overall power losses occur.

SUMMARY

An object of the present invention is to create an array antenna for radar sensors that operates with low losses and that enables an effective suppression of secondary lobes.

According to the present invention, this object is achieved in that the supply line is fashioned so as to be reflective at one end, and the circuit elements for distributing power are situated exclusively in the feed lines.

In the array antenna according to the present invention, the excess power is not radiated at the end of the supply line, which would result in undesired secondary lobes, and is also not destroyed using absorbers, which would result in undesired losses; rather, it is reflected and thereby reintroduced into the antenna elements, so that it can be radiated by these elements with the desired directional characteristic. Moreover, according to the present invention the circuit elements, such as transformers and the like, used for power distribution are not situated in the supply line, but rather are situated in the feed lines to the individual antenna elements. This has the advantage that the effect brought about by these circuit elements is independent of the direction of propagation of the microwaves in the supply line. Consequently, the transformers act on the reflected power, which propagates in the backward direction in the supply line and then enters into the antenna elements via the feed lines, in the same way as on the power originally supplied in the forward direction via the supply line. If the transformers were situated in the supply line this would not be possible, because then the transformer would have to be situated either on the one side or on the other side of the branching point in the supply line, so that symmetrical, direction-independent conditions would not be present at the branching point. In addition, the absence of transformers and comparable circuit components in the supply line makes it easier to suppress cross-polarizations.

The circuit elements for power distribution may be not only transformers, but for example also feed lines having reduced width, or feed lines coupled only capacitively to the supply line. Using circuit elements of this type, the power transmitted into the antenna element can be limited, which is often desirable in particular in the case of the end-situated antenna elements of an array antenna.

The reflection of the microwaves at the end of the supply line can be achieved by an open end or by a closed (short-circuited) end of the supply line, or also by a suitable termination.

In the following, exemplary embodiments of the present invention are explained in more detail with reference to the accompanying drawings.

DETAILED DESCRIPTION

Figure 1:
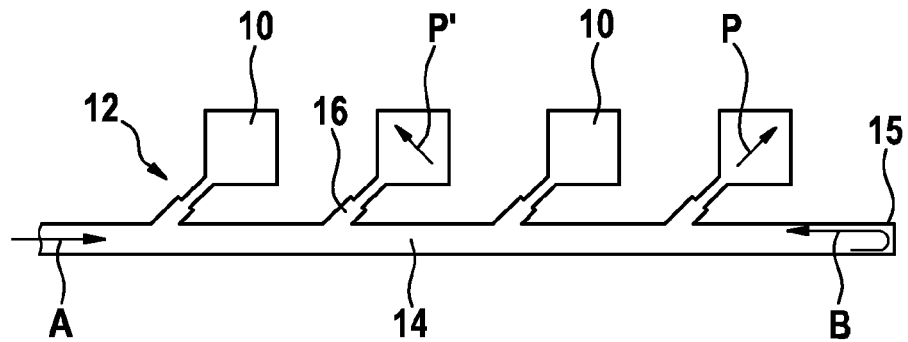
FIG. 1 shows an array antenna having four antenna elements situated in a row, according to an exemplary embodiment of the present invention.

The array antenna shown in FIG. 1 is fashioned for example in microstrip technology on a circuit board, and has four quadratic antenna elements 10 disposed in a row (or column), each connected via a feed line 12 to a common supply line 14, via which they are supplied with microwave power.

The microwave power is produced by an oscillator (not shown), and propagates in the direction in supply line 14 shown by an arrow A in FIG. 1, and then exits via feed lines 12 into antenna elements 10, by which it is radiated. The reception of microwave radiation takes place correspondingly in the reverse direction.

In the example shown in FIG. 1, each feed line 12 contains a transformer 16 that ensures that the associated antenna element 10 is provided with the correct quantity of power in the correct phase position. In each case, the transformer is formed by a widened line segment whose length corresponds to one-fourth the wavelength of the microwave radiation.

In FIG. 1, end 15 of supply line 14 is fashioned as an open end at which the microwave radiation is reflected, as symbolized by an arrow B. The spacings between the branching points of supply lines 12 for individual antenna elements 10, and the spacing between the last of these branching points and open end 15 of supply line 14, are for example selected such that the wave reflected at the open end, when superposed with the wave running towards it (arrow A), forms a standing wave whose antinodes are each situated at the branching points of the feed lines. In this way, it can be achieved that the supplied power is practically completely radiated via antenna elements 10 and is neither destroyed nor radiated by any other elements, which could contribute to stronger secondary lobes. Transformers 16 have the same effect on the reflected wave as on the incoming wave, so that they influence the amplitude and phase of the microwave radiation in the desired manner for both directions of propagation. Because transformers 16 are not situated in supply line 14, they also do not form disturbing points in this supply line that could cause undesired reflections. In this way, in addition an extensive decoupling of cross-polarizations is made easier.

In the example shown, antenna elements 10 are quadratic, and feed line 12 enters into the antenna element at a corner in each case. The emitted microwave radiation therefore has a linear polarization P that is indicated in FIG. 1 by an arrow at the rightmost antenna element. The excitation of cross-polarizations, with polarization direction P' at a right angle thereto, is largely avoided in the array antenna according to the present invention.

Feed lines 12 may also be formed differently than as shown in FIG. 1. This is illustrated in examples in FIGS. 2 through 4.

Figure 2:
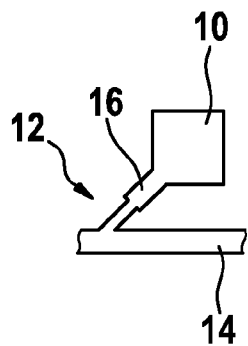
FIGS. 2 through 4 show exemplary embodiments of differently designed circuit elements for distributing power to the antenna elements.

While in FIG. 1 transformer 16 is situated in each case at that end of feed line 12 that branches off from supply line 14, FIG. 2 shows an alternative exemplary embodiment in which transformer 16 is immediately adjacent to antenna element 10.

Figure 3:
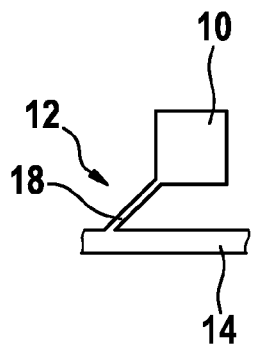

FIG. 3 shows an exemplary embodiment in which feed line 12 does not contain a transformer, but rather is formed overall by a microstrip line 18 having a smaller width. In this way, the power coupled into associated antenna element 10 can be throttled, which for antenna elements at the end of a column or group made up of a plurality of antenna elements is often desirable in order to suppress the occurrence of secondary lobes.

Figure 4:
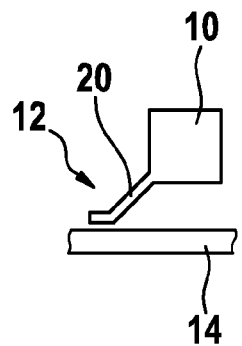

Finally, FIG. 4 shows an exemplary embodiment in which feed line 12 is formed by a line 20 that does not have any direct contact with supply line 14, but is rather merely capacitively coupled thereto.

Figure 5:
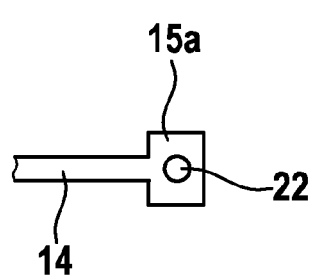
FIGS. 5 and 6 show alternative exemplary embodiments of a reflective end of a supply line.

Different designs are also conceivable for reflective end 15 of supply line 14 shown in FIG. 1. Instead of an open end (open stub), a closed end 15a may also be used, as shown in FIG. 5. In this case, the end of supply line 14 is short-circuited to the ground of the circuit board through a so-called via 22 (short stub).

Figure 6:
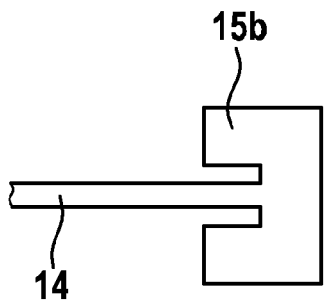

FIG. 6 shows a further possibility. Here, the reflective end of supply line 14 is formed by a complex terminating element 15b that reflects an adjustable portion of the power.

What is claimed is:

1. An array antenna for radar sensors, comprising:
a supply line;
a plurality of antenna elements each connected to the supply line via a feed line; and
circuit elements for distributing power to the antenna elements;
wherein the supply line is made reflective at one end, and the circuit elements for power distribution are situated exclusively in the feed lines.

2. The array antenna according to claim 1, wherein at least some of the circuit elements for power distribution are transformers.

3. The array antenna according to claim 2, wherein for at least one antenna element, the transformer is fashioned at an end of the feed line that adjoins the supply line.

4. The array antenna according to claim 2, wherein for at least one antenna element, the transformer is situated at an end of the feed line that adjoins the antenna element.

5. The array antenna according to claim 1, wherein at least one of the circuit elements for power distribution is formed by a feed line in a form of a microstrip having reduced width.

6. The array antenna according to claim 1, wherein at least one of the circuit elements for power distribution is formed by a feed line in a form of a strip conductor that is coupled only capacitively to the supply line.

7. The array antenna according to claim 1, wherein the reflective end of the supply line is an open-circuit end.

8. The array antenna according to claim 1, wherein the reflective end of the supply line is a closed end.

9. The array antenna according to claim 1, wherein the reflective end of the supply line is formed by a terminating element.

* * * * *